United States Patent [19]
Ho et al.

[11] 3,740,730
[45] June 19, 1973

[54] LATCHABLE DECODER DRIVER AND MEMORY ARRAY

[75] Inventors: Irving Tze Ho, Poughkeepsie; Teh-Sen Jen, Fishkill, both of N.Y.

[73] Assignee: International Business Machines Corporation, Armonk, N.Y.

[22] Filed: June 30, 1971

[21] Appl. No.: 158,316

[52] U.S. Cl. ............ 340/173 R, 307/206, 307/238, 307/252 K
[51] Int. Cl. ............................................. G11c 7/00
[58] Field of Search ............... 340/173 R; 307/238, 307/252 K, 206

[56] References Cited

UNITED STATES PATENTS

| | | | |
|---|---|---|---|
| 3,510,850 | 5/1970 | Glusick | 340/173 R |
| 3,609,712 | 9/1971 | Dennard | 307/238 X |
| 3,628,050 | 12/1971 | Guzak | 307/252 K |
| 3,292,036 | 12/1966 | Colton | 307/252 K |
| 3,624,620 | 11/1971 | Andrews | 340/173 R |

OTHER PUBLICATIONS

Schuenemann, Address Decoder, 9/69, IBM Technical Disclosure Bulletin, Vol. 12, No. 4, 307–238, p. 637

*Primary Examiner*—Bernard Konick
*Assistant Examiner*—Stuart Hecker
*Attorney*—Kenneth R. Stevens and Hanifin and Jancin

[57] ABSTRACT

A monolithic memory comprising an array of semiconductor storage cells and a plurality of decoders for accessing information to the storage cells during a given duty cycle. Reduced power consumption is achieved by the application of addressing signals to the decoder input lines for a given time period less than the accessing duty cycle in order to attain full duty cycle activating signals on the decoder output lines for accessing the memory array, and also by virtue of the selected address input lines associated with a selected decoder not drawing current during the given time period.

9 Claims, 10 Drawing Figures

INVENTORS
IRVING T. HO
TEH-SEN JEN
BY Kenneth R. Stevens
ATTORNEY

LATCHABLE DECODER DRIVER AND MEMORY ARRAY

FIELD OF THE INVENTION

This invention relates to memory storage and more particularly to a monolithic memory array and decoder accessing system.

BRIEF DESCRIPTION OF THE PRIOR ART

In the area of monolithic memories, power reduction is a primary consideration in the manufacture of monolithic integrated circuit memory arrays and accessing systems. Initially, a great deal of effort was expended in reducing the size and the power requirements of the memory arrays themselves. As the technology advanced and the objectives of power reduction in the array itself approached optimum conditions, efforts then developed to further reduce power requirements in the attendant support circuits, for example, in the decoding arrangements.

A pulse powered decoding scheme as disclosed in U. S. Pat. No. 3,573,758, issued Apr. 6, 1971, and assigned to the assignee of the present application, illustrates the direction of these efforts. In order to reduce power requirements for the support or decoding circuitry in a monolithic integrated circuit memory system, the decoder drivers are operated in a pulse powered mode. That is, during a non-accessing period or when information is not being read from or into the memory array, the decoding circuits are maintained at a minimum sustaining power level. However, when the memory array is being accessed during a given duty cycle, the input lines to the decoder drivers are raised to a maximum sustaining level for the entire duty cycle. Accordingly, during the non-accessing period power savings are realized.

SUMMARY OF THE INVENTION

It is an object of the present invention to provide a monolithic memory array and decoding arrangement which provides improved power reduction savings in decoder driver support circuitry over that known in the prior art.

It is also an object of the present invention to provide improved power reduction savings in the decoder driver support circuits, and also a power reduction saving in the number of decoder driver circuits which need to be activated in order to access a particular memory cell in a monolithic memory array.

In accordance with the aforementioned objects, the present invention provides an array of semiconductor storage cells interconnected with a plurality of decoders for accessing information to the storage cells during a given duty cycle. The decoders need only be energized at their input terminals for a time period less than the given duty cycle in order to provide activating signals at their output terminals for accessing information into and out of the memory array. In other words, there is no current flow on the address lines of the selected decoder after it has switched to its low impedance state. Additionally, in an X and Y accessing scheme only one decoder in the X direction and one decoder in the Y direction need by selected or activated in order to access a particular memory cell within the array.

The foregoing and other objects, features and advantages of the invention will be apparent from the following more particular description of the embodiments of the invention, as illustrated in the accompanying drawings, wherein:

DESCRIPTION OF THE PREFERRED EMBODIMENTS

Figure 1:
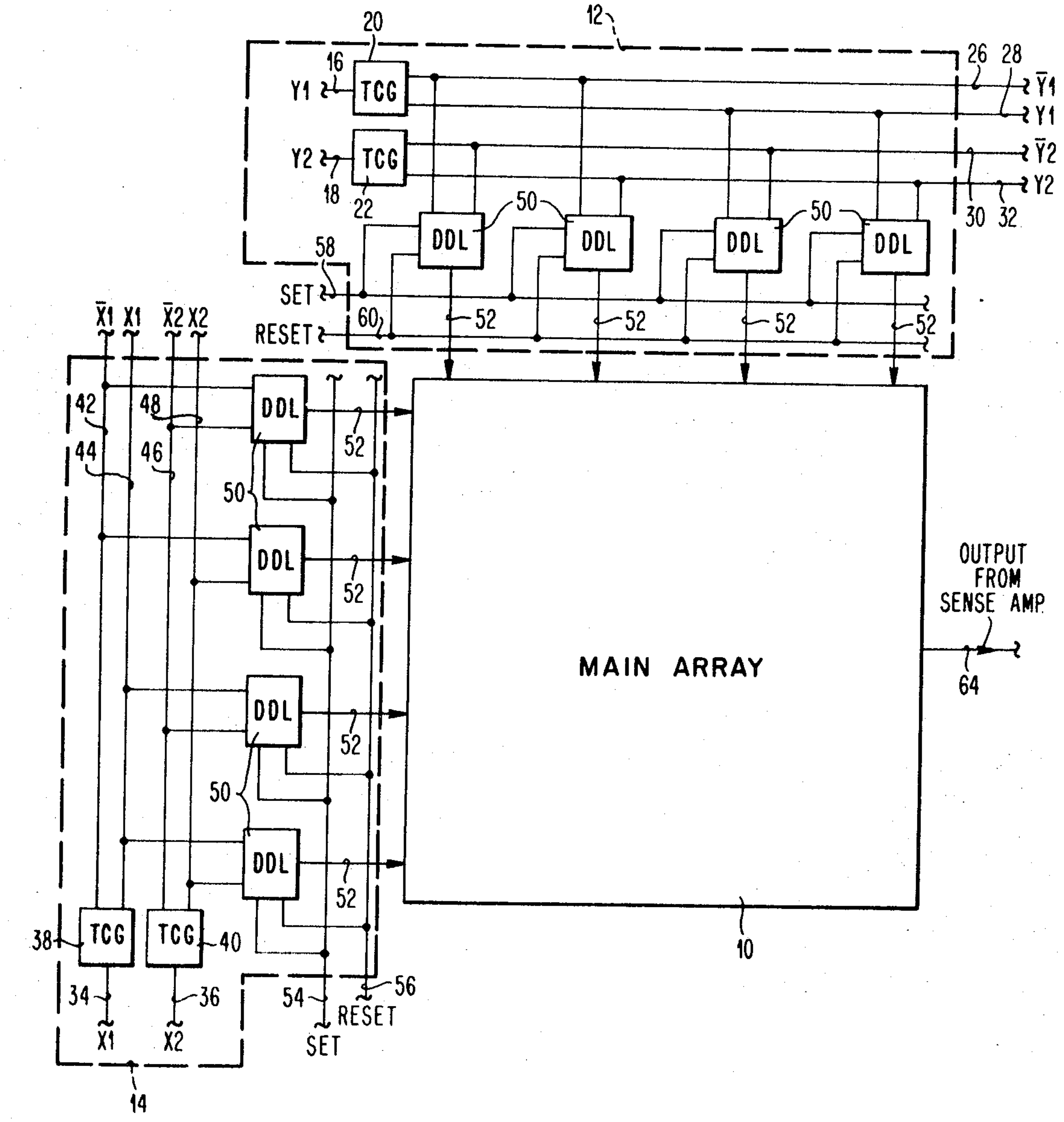
FIG. 1 is a schematic illustrating the memory array and accessing support circuits.

Now referring to FIG. 1, it illustrates a monolithic memory array 10 connected to Y support circuits 12 and to X support circuits 14. In the illustrated example, the main memory array comprises a plurality of monolithic cells (not shown). For the depicted decoding circuitry, a 4 × 4 arrangement is used. The structural aspects of the memory cells do not form part of the invention, and they can be implemented in either a read-only or a random access mode. The Y support circuitry receives a pair of address signals Y1 and Y2 on respective input lines 16 and 18 and which are connected to a pair of true complement generators (TCG) shown at 20 and 22, respectively. The true complement generators are well known and provide respective complement and true output signals on lines 26, 28, 30, and 32.

Similarly in the X direction, the support circuits include a pair of address input signals X1 and X2 connected to lines 34 and 36 and which in turn are connected to respective true complement generators 38 and 40. Again, the true complement generators provide true and complement signals on lines 42, 44, 46, and 48.

In order to access information to the main memory array 10, a plurality of decoder driver latch circuits (DDL) 50 are interconnected between the array 10 and the true complement lines in the X direction, and the true complement lines in the Y direction. Each of the decoder driver latch circuits are designated 50 since they may be of identical construction. The circuits 50 receive addressing signals at their input terminals, i.e., true-complement signals, and provide an activating signal on their respective output lines 52.

In order to set and reset the decoder driver latches 50 a set line 54 and a reset line 56 is commonly connected to the circuit in the X direction, and a set line 58 and a reset line 60 are connected to the decoder driver latch circuits in the Y direction.

When the decoder driver latch circuits are implemented in accordance with the present invention, a single cirucit 50 in the X direction and a single circuit 50 in the Y direction are collectively effective to access a single memory cell in the main array 10 so as to provide an output signal from a sense amplifier schematically illustrated as output line 64.

Figure 2:
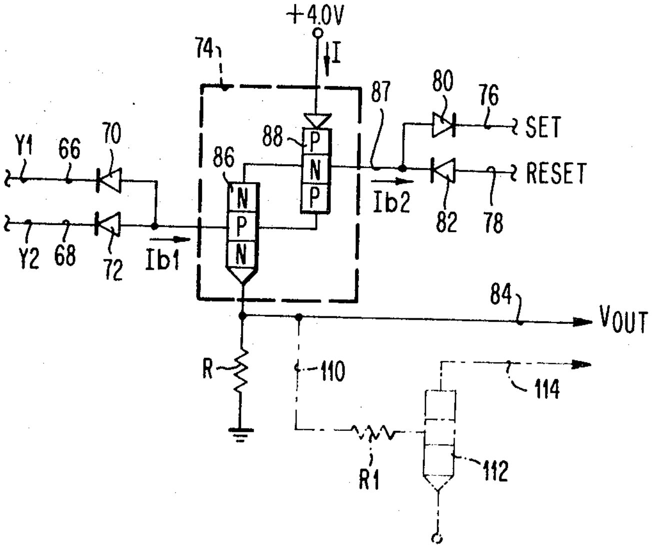
FIGS. 2–2C are circuit schematics and attendant voltage waveforms illustrating the structure and its manner of operation of a preferred decoder driver latch (DDL), suitable for implementation into the FIG. 1 arrangement according to the present invention.
Figure 2A:
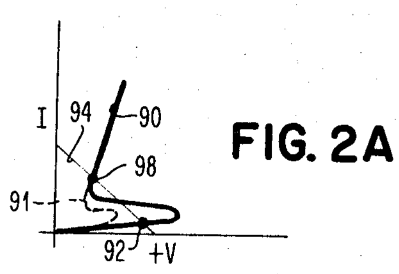
Figure 2B:
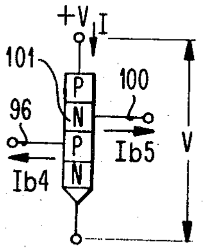
Figure 2C:
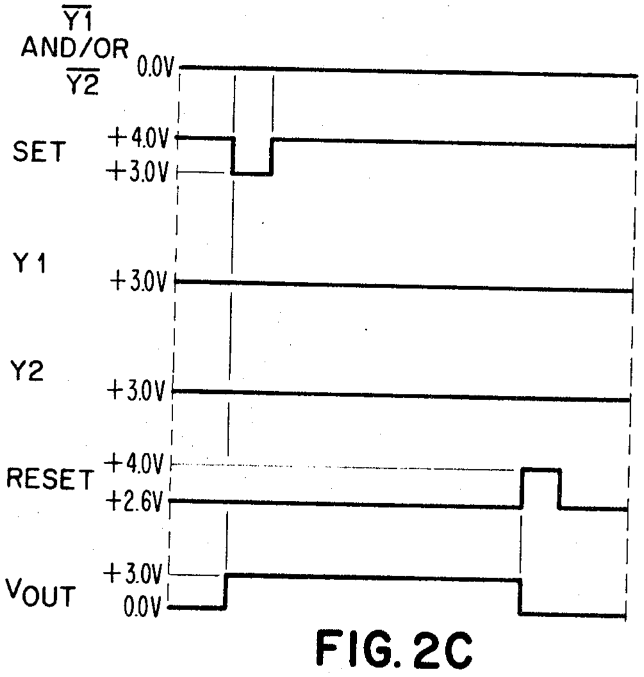

Now referring to FIGS. 2–2C which illustrate a specific circuit schematic and operational control voltages for a DDL circuit which can be directly implemented as the decoder driver latches shown in FIG. 1 as elements 50. The address signals Y1 and Y2 are received on a pair of input lines 66 and 68, respectively, and correspond to the true complement signals which would be generated by the true complement generators 20 shown in FIG. 1. Lines 66 and 68 are connected to a diode AND gate comprising diodes 70 and 72. The silicon controlled rectifier (SCR) implemented in monolithic form is schematically shown as element 74. In this particular embodiment Set and Reset signals are applied to lines 76 and 78 via diodes 80 and 82, respectively. The output address signal which is applied to a memory cell for accessing a cell is shown as $V_{out}$ taken from output line 84. The SCR 74, in essence, comprises an NPN transistor 86 and a PNP transistor 88. A load resistor R is connected to the N equivalent emitter terminal of transistor 86.

The Y1 and Y2 signals applied via the diode gate comprising diode 70 and 72 are applied to the middle or P region of the NPN transistor 86 so as to provide a current Ib1 in the direction shown for certain relative polarities of input signals Y1 and Y2. Similarly, current Ib2 flows in the direction shown from the middle or N layer of equivalent PNP transistor 88 for appropriate voltage polarities, as hereinafter described in more detail.

FIG. 2A illustrates the basic operating characteristics for an SCR device shown in FIG. 2B as a four layer PNPN device. The device shown in FIG. 2B is simply another schematic representation of the SCR device shown as element 74 in FIG. 2.

A conventional four layer PNPN device 74 possesses a voltage-current characteristic shown by the waveform designated 90 with Ib1 = Ib2 = 0. When either Ib1 or Ib2 is larger than zero, the dotted line V-I characteristic 91 should be used. In the high impedance state the SCR resides at point 92 which is the intersection of its characteristic curve 90 and load line 94. One way to set the SCR 74 to the state 92 is to pull current Ib4 out of terminal 96 in the direction shown, or to set the voltage potential at 96 equal to or lower than that of the bottom region or cathode of the PNPN device. Conversely, if current Ib4 is sent into the P region in the opposite direction from that shown, or if the voltage potential at 96 is approximately 0.75 volts or higher than that of the cathode of the PNPN device, then the SCR 74 will switch to a low impedance level state indicated by point 98. Accordingly, by controlling the direction of current flow or the voltage potential at terminal 96 the SCR 74 is latchable into either one of two stable states.

Similarly, the state of SCR 74 is controllable by the direction of current flow Ib5 which is applied to the uppermost N type region 101 via terminal 100. The PNPN device can be turned on, (98), or turned off, (92), by pulling current Ib5 out of region 101, as shown, or sending a current into terminal 100 in the opposite direction for the off state. The voltage potential of region 101 is now referred to as the anode of the PNPN device. The device will be in an off state when the top PN junction of the PNPN device is not forward biased. With both terminals 100 and 96 being controlled, the PNPN device can only be turned on when all its three PN junctions are in a forward biased state.

The basic theory of operation as explained in connection with FIGS. 2A and 2B is applied to the decoder driver latch more particularly shown in FIG. 2. In FIG. 2, the direction of current flow constituted by the currents Ib1 and Ib2 is selectively controlled by the application of addressing signals Y1 and Y2 to the address input lines 66 and 68, and by the application of Set and Reset signals to lines 76 and 78.

Thus with reference to the specific embodiment of FIG. 2, the SCR 74 is selectively controlled to provide an activating output voltage $V_{out}$ of approximately +3.0 volts for a supply voltage of +4.0 in the following manner. The address input lines 66 and 68 are each maintained at a value slightly higher than +3.0 volts and simultaneously therewith, the line 76 is lowered to approximately +3.0 volts by the application of a SET signal. The application of the address signals Y1 and Y2 set the lower PN junction of transistor 86 to a floating state or condition. In this instance, Ib1 is essentially 0. Since Ib1 is zero, no power is being consumed by the address lines of the selected decoder. The addressing signals $\overline{Y1}$ and/or $\overline{Y2}$ indicate the voltage which is being applied to the other non-selected decoders, for example, as shown by elements 50 in FIG. 1.

The application of a relatively negative SET signal on line 76 causes current Ib2 to flow out of the N region of transistor 88 in the direction shown, so as to drive or set the SCR circuit 74 to a low impedance or high current state corresponding to that previously shown in FIG. 2A as 98. In this state, the output terminal 84 is at a relatively high or up level, and in this example is approximately +3.0 volts. The voltage $V_{out}$ is thus effective to select or access one of the memory cells in the array.

All of the other possible combinations of addressing signals in Y direction, $\overline{Y1}$ $\overline{Y2}$, $\overline{Y1}$ Y2 and Y1 $\overline{Y2}$ are effective to set the lower PN junction of their associated SCR NPN transistor to a non-forward bias state and thus these non-selected SCR devices 74 cannot be turned on. These non-selected decoders consume a small amount of power while the addressing and set lines are being pulsed. The addressing signal for the non-selected DDL circuits is designated by $\overline{Y1}$ and/or $\overline{Y2}$.

Often,a memory cell is designed such that a positive signal is used in one of the coordinate directions and a relatively negative signal is used in the other coordinate direction. In such a case, the basic circuit can be easily modified by the addition of line 110, resistor R1 and NPN transistor 112 so as to provide a relatively negative output level on the output line 114 so as to accommodate a positive-negative select mode. If a positive-positive scheme of selection is employed, then the additional element shown in phantom lines are unnecessary. For the combination shown in FIG. 1, it is assumed that a positive-positive or negative-negative mode is used since all the DDL circuits 50 of FIG. 1 are deemed to be identical.

Once the duty or accessing cycle for a particular cell is completed, a RESET pulse is applied to line 78 in order to reset the SCR device 74 to its high impedance state corresponding to that point previously shown in FIG. 2A as 92. The relatively positive RESET pulse of approximately +4.0 volts applied to the terminal 78 will cause a current Ib2 to flow in a direction opposite to that shown.

Figure 3:
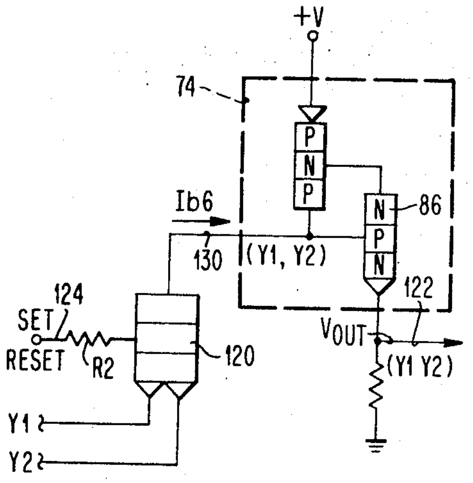
FIGS. 3, 3A and 4, 4A illustrate similar circuit schematics of decoder driving latches and their accompanying operating voltage waveforms, similar to that shown in FIG. 2, and also suitable for implementation into the arrangement of FIG. 1.
Figure 3A:
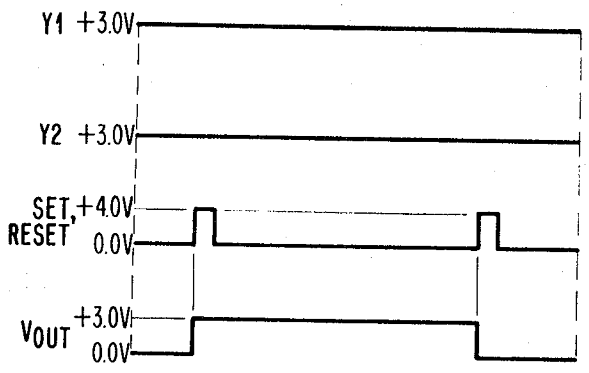

FIG. 3 represents a substantially identical counterpart to that circuit shown in FIG. 2, except the set, reset, and application of the addressing signals Y1 and Y2 are now controlled and implemented by a $T^2L$ input circuit 120. The decoder driver latch circuit of FIG. 3 comprises a monolithically integrated SCR 74 as previously shown in FIG. 2. An output terminal 122 provides an output activating voltage $V_{out}$. Upon the simultaneous application of addressing input signals Y1 and Y2 to the emitter terminals of the $T^2L$ transistor 120, and the application of a SET signal to the base terminal of multi-emitter transsitor 120 via input line 124 and resistor R2, a current Ib6 flows in the direction indicated. That is, with the indicated relative voltage polarities being applied to multi-emitter transistor 120 the device operates as a conventional $T^2L$ circuit and no current is allowed to flow via the base emitter diodes of device 120. All of the current flows via the base collector terminals. This operation causes a relatively positive output activating signal $V_{out}$ of approximately +3.0 volts to be generated on output terminal 122. This decode driver latch circuit provides the same function as that previously described in FIG. 2, but in this instance the address, SET, and RESET signals are applied through a single control line 130 connected to the SCR device 74.

Figure 4:
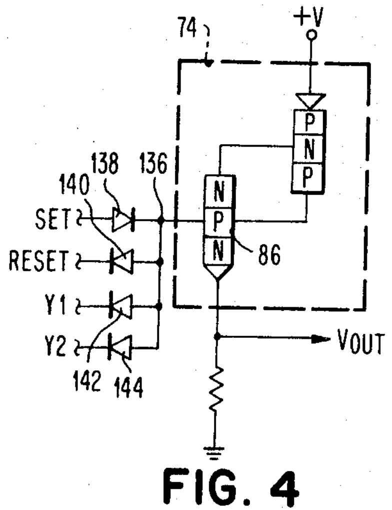
Figure 4A:
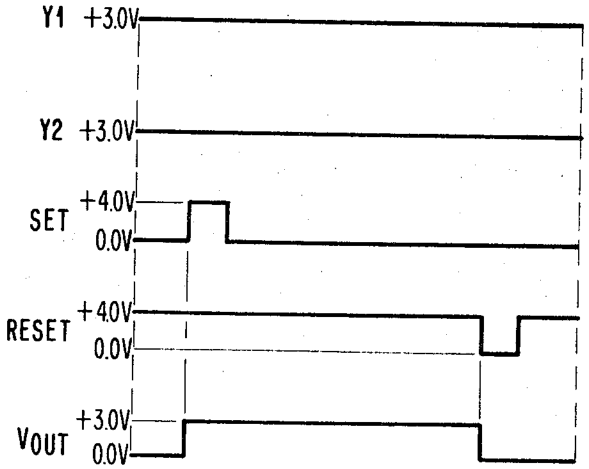

FIG. 4 represents a modification to those circuits previously described with reference to FIGS. 2 and 3, but again employing the same basic SCR device 74. FIG. 4A represents the necessary control signal which must be applied to the address input lines, and the SET and RESET lines in order to obtain an output activating voltage $V_{out}$. Again, these functions are combined and applied to a single layer of the four layer PN device 74 via node 136. The SET signal is applied via an input diode 138, the RESET signal via an input diode 140, and the address signals Y1 and Y2 via an AND gate comprising diodes 142 and 144. The operation of the decode driver latch circuit shown in FIG. 4 is similar to that previously described, except it is now necessary to provide opposite poled diodes 138 and 140 in order to control the direction of the current flow into the P region of NPN transistor 86. In both FIG. 3 and FIG. 4, $\overline{Y1}$ and/or $\overline{Y2}$ waveforms are the same as those shown in FIG. 2C.

Figure 5:
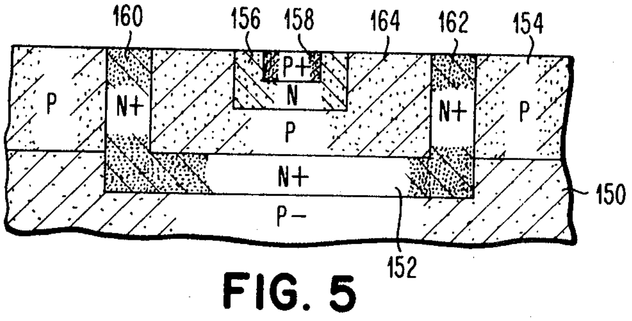
FIG. 5 illustrates a monolithic implementation for the silicon controlled rectifiers (SCR) schematically illustrated in FIG. 2, FIG. 3 and FIG. 4.

FIG. 5 illustrates a monolithic implementation which can be used to fabricate the four layer SCR device previously designated as element 74. The device is fabricated on a monolithic P- type substrate 150. Thereafter, an N+ diffused region 152 is formed in the substrate 150. Thereafter, a P type epitaxial region 154 is grown over the P- type substrate 150. Conventional diffusion steps are then performed to form N type region 156 and P+ region 158. In order to isolate the device, N+ diffused regions 160 and 162 are formed in the P type epitaxial layer 154. Appropriate contacts are then made to the device in order to form the four layer PNPN device previously designated as element 74. The regions 158, 156 and the P type epitaxial pocket 164 corresponds to the PNP transistor previously designated 88. Similarly, the region 156, 164, and 152 correspond to the NPN transistor previously designated 86. The specific monolithic implementation of the SCR device does not form part of the invention but is simply discussed as one preferred method of fabrication in order to obtain a high density four layer device.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for decoding a matrix of semiconductor storage cells having cells arranged in a plurality of rows and columns, the apparatus for decoding comprising:

a first plurality of decoding means, one each associated with each one of said plurality of rows of storage cells;

a second plurality of decoding means, one each associated with each one of said plurality of columns of storage cells;

each said first and second plurality of decoding means being adapted to receive primary addressing signals of relatively long time duration thereby selecting only one of said first plurality of decoding means and only one of said second plurality of decoding means; and each said first and second plurality of decoding means being adapted to receive a secondary input signal of relatively short time duration, and causing the selected one of said first plurality and the selected one of said second plurality of decoding means to conduct a relatively high level of current for a period of time commencing with the common occurrence of both said primary addressing signals and said secondary input signal until the termination of the primary addressing signals, while the remainder of said plurality of first and plurality of second decoding means conduct only a negligible amount of current.

2. A monolithic memory comprising:

a. an array of semiconductor storage cells, b. a source of power, c. a plurality of decoder means, having primary address input and output lines and secondary input lines, said plurality of decoder means connected to the source of power and to the storage cells, d. the primary address input lines being adapted to receive addressing signals for selectively activating the decoder means so as to provide output activating signals on the output line of a selected decode means, the output activating signal being maintained during a duty cycle having a first time period so as to access data to the storage cells, and e. the secondary input lines of said plurality of decoder means being energized by a secondary signal for a second time period, the second time period being less than said first time period, f. said decoder means being latchable and having a high current and a low current state, and g. the selected decoder means being latchable to a high current state upon the application of both predetermined address signals of a minimum threshold level and said secondary signal, and being operatively maintained in the high current level state during the first time period beyond the termination of said secondary signal.

3. A monolithic memory as in claim 2 wherein said plurality of decoder means comprises;

a signal stage of decoding between said source of power and said array of semiconductor storage cells.

4. A monolithic memory as in claim 2 wherein
a. a plurality of *n* decoder means are arranged in an X direction and a plurality of *m* decoder means are arranged in a Y direction,
b. the decoder means comprising logic means and a two state device means, and
c. one out of *n* of said X decoder means and one out of *m* of said Y decoders being selectively switched to a high current level state in order to access a memory cell, and
d. the address lines associated with said selected one out of *n* and one out of *m* decoder means being at a substantially zero current level during said first time period so as to minimize power consumption.

5. A monolithic memory array as in claim 4 wherein
a. said two state device means comprises a monolithic four layer silicon controlled rectifier including unified NPN and PNP transistors.

6. A monolithic memory array as in claim 5 wherein
a. said logic means is connected between said address lines and one of said regions of said silicion controlled rectifier.

7. A monolithic memory array as in claim 6 further including set and reset means connected to another region of said silicon controlled rectifier.

8. A monolithic memory array as in claim 6 wherein said logic means includes diode means for receiving said address input signal and diode means for receiving set and reset signals.

9. A monolithic memory array as in claim 6 wherein said logic means includes a multi-emitter transistor adapted to receive addressing signals and set and reset signals.

* * * * *